United States Patent [19]

Asakawa et al.

[11] Patent Number: 5,043,213
[45] Date of Patent: Aug. 27, 1991

[54] MAGNETIC DISK

[75] Inventors: Masuo Asakawa; Hikaru Ogawa; Kenji Hirata, all of Amagasaki, Japan

[73] Assignee: Mitsubishi Denki Kabushiki Kaisha, Tokyo, Japan

[21] Appl. No.: 561,779

[22] Filed: Aug. 2, 1990

[51] Int. Cl.$^5$ .................................................. G11B 7/24
[52] U.S. Cl. ..................................... 428/336; 428/694; 428/900
[58] Field of Search ................................ 428/694, 900

[56] References Cited

U.S. PATENT DOCUMENTS

| | | | |
|---|---|---|---|
| 3,516,860 | 6/1970 | Simmons | 117/236 |
| 4,277,809 | 7/1981 | Fisher et al. | 428/900 |
| 4,629,660 | 12/1986 | Sagoi et al. | 428/900 |

FOREIGN PATENT DOCUMENTS

| | | |
|---|---|---|
| 060404 | 4/1983 | Japan . |
| 055128 | 11/1988 | Japan . |
| 093227 | 4/1989 | Japan . |
| 115235 | 5/1989 | Japan . |

Primary Examiner—Merrell C. Cashion, Jr.
Attorney, Agent, or Firm—Wolf, Greenfield & Sacks

[57] ABSTRACT

A magnetic disc wherein a shielding layer is provided between a recording layer for recording data therein and a substrate to shield electromagnetic waves generated from a magnetic head which records/regenerates data in/from said recording layer.

7 Claims, 4 Drawing Sheets

MAGNETIC DISK

BACKGROUND OF THE INVENTION

1. Field of the Invention

This invention relates to a magnetic disc incorporated in a Winchester disc unit or the like wherein reading/writing data and reading servo data for positioning a disc are simultaneously executed.

2. Description of the Related Art

At present, aluminum alloy is put to practical use for material of a substrate of a magnetic disc housed in a Winchester disc unit. However, glass, ceramics, resin, etc. are also proposed for the material so as to realize a smooth-faced magnetic disc lighter in weight.

FIG. 1 is a diagram showing the structure of a conventional magnetic disc made of the material mentioned above and provided with recording layers on both sides thereof, as well as the relation between the magnetic disc and magnetic heads. A magnetic disc 1 of FIG. 1 is comprised of two magnetic layers 3 for recording data therein, and protective layers 4 for protecting respective magnetic layers 3 provided at both surfaces of a glass substrate 2. A magnetic head 6 having a very small gap 9 is arranged adjacent to each recording layer of the magnetic disc 1. A coil 7 is wound around the magnetic head 6.

The principle how the magnetic heads 6 write/read data to/from the magnetic disc 1 will be explained hereinafter. In writing data, the current is supplied to the coil 7, thereby exciting the magnetic head 6 to generate a magnetic flux 8. As a result, leakage flux generated in the small gap 9 magnetizes the magnetic layer 3 in a desired direction. An arrow designated by numeral 10 in FIG. 1 indicates the direction of magnetization of the magnetic layers 3.

On the other hand, in reading data, magnetic fields brought about from the magnetic layer 3 magnetized in specific directions induce currents on the coil 7. These induced currents are read as electric signals of the data.

The magnetic disc 1 having the aforementioned structure is manufactured as follows. In the first place, the disc-shaped glass substrate 2 is formed with the average surface roughness not exceeding 0.2 μm with an outer diameter (φ) of 95 mm and a thickness (t) of 1.2 mm. Then, 2000 Å Cr layer as a foundation of the magnetic layer 3, and 600 Å Co alloy layer as the magnetic layer 3 and 500 Å carbon layer as the protective layer 4 are successively formed through sputtering on the glass substrate 2, whereby the magnetic disc 1 is completed.

FIG. 2 is a block diagram showing general structure of a Winchester disc unit. A plurality of magnetic discs 1 are fixed to a common spindle 11 at their respective centers, so that the discs 1 are simultaneously rotated by the rotation of the spindle 11. The opposite surfaces of each magnetic disc 1 are rendered data surfaces 17 for reading/writing data. A data head 12 which reads/writes data from/to the magnetic layer 3 is arranged adjacent to said data surface 17. One of the discs 1 has its one surface assigned for a servo surface 18 wherein servo data for positioning the magnetic head 12 on the magnetic disc 1 is written. A servo head 13 is provided adjacent to the servo surface 18 to read the data from the servo surface 18. The data heads 12 and servo head 13 are respectively supported by head arms 14 which are held by a slidable actuator 15. A voice coil motor 16 slides the actuator 15 to a desired position on the basis of positional data obtained by the servo head 13. Consequently, the servo head 13 and all of the data heads 12 are moved in a radial direction of the magnetic discs 1.

Meanwhile, positioning of the data head 12 in the Winchester disc unit will be discussed hereinafter. When the servo head 13 reads and amplifies positional data preliminarily written in the servo surface 18, the voice coil motor 16 is controlled thereby to slide the actuator 15 to a predetermined position, so that the data heads 12 are positioned at the desired position.

Positional signals as servo data are written by a servo writer to one surface of the magnetic disc 1 fabricated in the foregoing manner. The magnetic disc 1 is then tested by a disc tester incorporating the magnetic disk 1 therein, the result of which will be described below. It is to be noted here that the data heads 12 and servo head 13 are monolithic heads formed of Mn-Zn ferrite.

When only the servo head 13 is installed, the positional signals are properly read.

When the servo head 13 is provided and also the data head 12 is mounted at the disc surface opposite to that the servo head 13 is provided at, while data is being written to the magnetic disc 1 by the disc head 12, the servo head 13 cannot properly read the positional signals, and the data head 12 and servo head 13 are deviated from the desired position.

In the above state, while supplying the data head 12 with current for writing to cause leakage flux, an electromotive force induced to the coil 7 of the servo head 13 is measured, which is large enough to influence induced electromotive force generated to read the positional signals.

In the Winchester disc unit, the magnetic heads 12 and 13 are positioned concurrently with writing/reading of data to/from the data surfaces 17 by the data heads 12. Since electromagnetic waves generated by the data head 12 while writing the data, penetrate the magnetic disc 1 and are to be electromagnetic noises against the servo head 13 reading the positional data, the conventional Winchester disc unit is inconveniently low in positioning accuracy.

SUMMARY OF THE INVENTION

This invention is devised so as to solve the abovedescribed disadvantage, and its main object is to provide a magnetic disc which is provided with a shielding layer between a substrate and a recording layer, so that electromagnetic waves generated by a magnetic head is prevented from reaching through the magnetic disc to the other magnetic head, thereby enhancing positioning accuracy.

The above and further objects and features of the invention will more fully be apparent from the following detailed description with accompanying drawings.

DESCRIPTION OF THE PREFERRED EMBODIMENTS

A magnetic disc according to this invention will be discussed hereinafter with reference to accompanying drawings.

Figure 1:
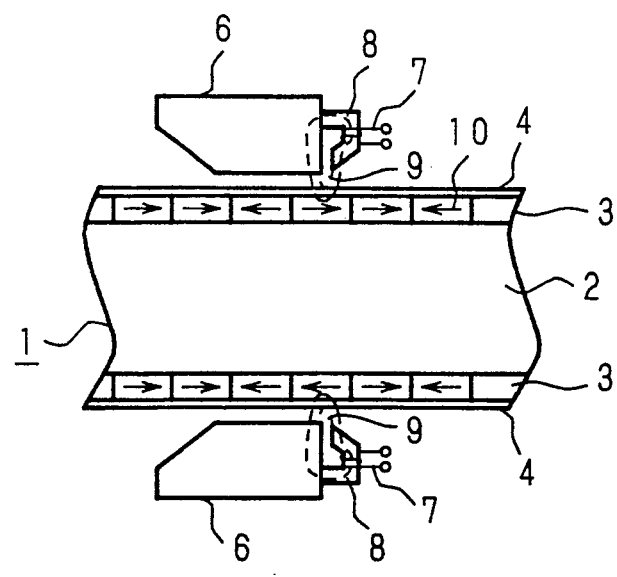
FIG. 1 is a diagram showing the structure of a conventional magnetic disc and the relation between the magnetic disc and magnetic heads.
Figure 2:
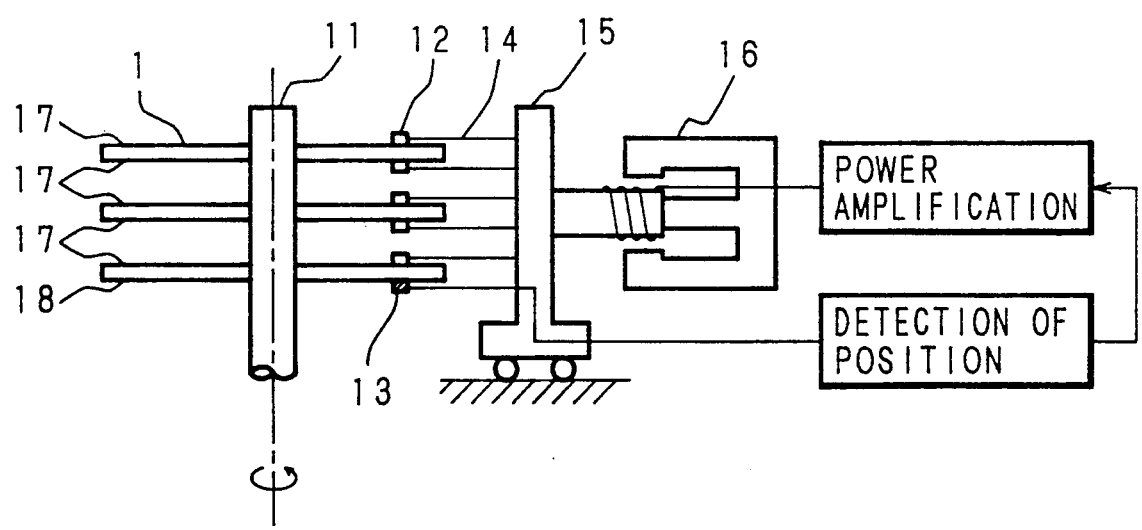
FIG. 2 is a diagram showing the structure of a Winchester disc unit.
Figure 3:
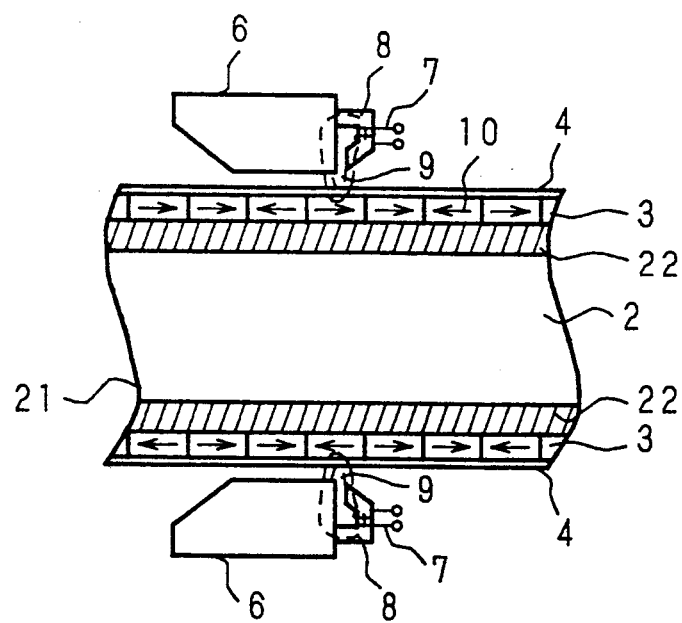
FIG. 3 is a diagram showing the structure of a magnetic disc according to this invention and the relation between the magnetic disc and magnetic heads.

FIG. 3 is a diagram showing the structure of a magnetic disc according to this invention and the relation between this magnetic disc and magnetic heads. In FIG. 3, a magnetic disc 21 is comprised of a glass substrate 2, shielding layers 22 provided at opposite surfaces of the glass substrate 2 for shielding electromagnetic waves generated by magnetic heads, a magnetic layer 3 laminated on each shielding layer 22 for recording data therein, and a protecting layer 4 for protecting respective magnetic layer 3. A magnetic head 6 having a very small gap 9 and wound by a coil 7 is arranged adjacent to each recording surface of the magnetic disc 21.

The writing/reading principle of data by the magnetic heads 6 to/from the magnetic disc 21 will be described below. When writing data to the magnetic disc 21, the current is supplied to the coil 7 for exciting the magnetic head 6 to generate magnetic flux 8. Accordingly, the magnetic layers 3 are magnetized in a desired direction by leakage flux in the small gaps 9. An arrow designated by numeral 10 in FIG. 3 shows the direction of magnetization of the magnetic layers 3.

When reading data, the currents are induced to the coil 7 by magnetic fields generated from the magnetic layer 3 which is magnetized in specific directions. The induced currents are read as electric signals of the data.

The first embodiment of the magnetic disc 21 having the aforementioned structure will be manufactured as follows. A glass substrate 2 is formed into a disc shape having the average surface roughness of 0.2 $\mu$m or less. The substrate has an outer diameter ($\phi$) of 95 mm and a thickness (t) of 1.2 mm. A shielding layer 22 is formed of nonmagnetic Ni-P alloy through electroless plating onto both surfaces of the glass substrate 2, which is then ground to have the average surface roughness of 0.06 $\mu$m or less. In the manner as above, three kinds of the discs each with two Ni-P alloy layers of 0.5 $\mu$m, 5 $\mu$m or 15 $\mu$m thick for one layer are produced.

Thereafter, Cr layer of 2000 Å thick as a foundation of the magnetic layer 3, Co alloy layer of 600 Å thick as the magnetic layer 3 and carbon layer of 500 Å thick as the protective layer 4 are sequentially formed on the Ni-P alloy layer through sputtering, thus manufacturing the magnetic disc 21.

The conventional magnetic disc 1 without the shielding layer 22 is manufactured for comparison in the same manner and under the same conditions as the magnetic disc 21 of this invention.

Just as the conventional magnetic disc 1 is tested in the manner described before, both the data head 12 and the servo head 13 are provided confronting each other at both surfaces of the magnetic disc 21 of this invention. While the data head 12 is supplied with a current for writing to generate leakage flux, an induced electromotive force of the servo head 13 is measured for examining the effect of shielding the electromagnetic wave.

Figure 4:
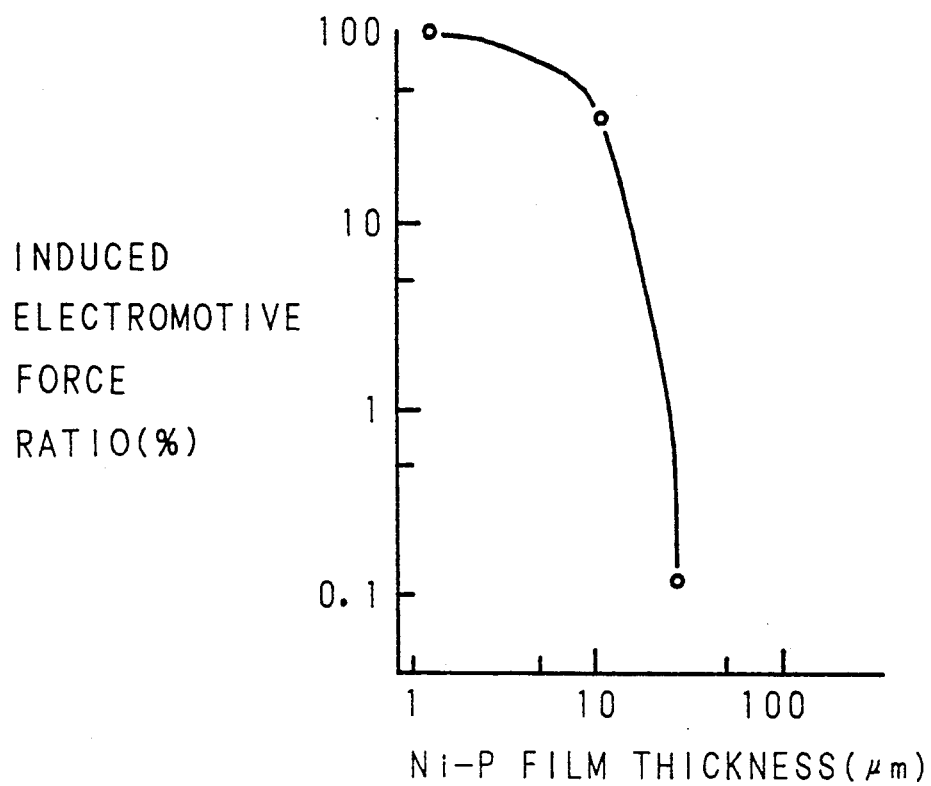
FIGS. 4 and 5 are graphs each showing the relation between the film thickness of an electromagnetic wave shielding layer and induced electromotive force in the magnetic heads.

FIG. 4 is a graph indicating the induced electromotive forces generated in the magnetic discs 21 each with two shielding layers 22 having a thickness of 0.5 $\mu$m, 5 $\mu$m or 15 $\mu$m for one layer. In the graph, the abscissa axis indicates the total film thickness of shielding layers 22 on both sides, and the ordinate axis indicates the induced electromotive force ratio of the magnetic disc 21 of this invention supposing that in the conventional magnetic disc 1 is induced 100% electromotive force. The electromotive force ratios are 99.7%, 42% and 0.12% in respective film thicknesses. As is apparent from the graph, when the total film thickness of the shielding layers 22 on both surfaces exceeds 10 $\mu$m, the induced electromotive force ratio is smaller, that is, the effect of the shielding layers 22 is noticeable.

The manufacturing process of the second embodiment of the magnetic disc 21 of this invention will be described as follows. A shielding layer 22 made of magnetic material such as permalloy (Ni: 50% by weight and Fe: the rest) is formed through sputtering on both surfaces of the same glass substrate 2 as in the first embodiment. Three kinds of discs 21 each with two permalloy layers 22 of 0.025 $\mu$m, 0.25 $\mu$m or 2.5 $\mu$m thick for one layer are produced. The other processes are the same as in the first embodiment.

Figure 5:
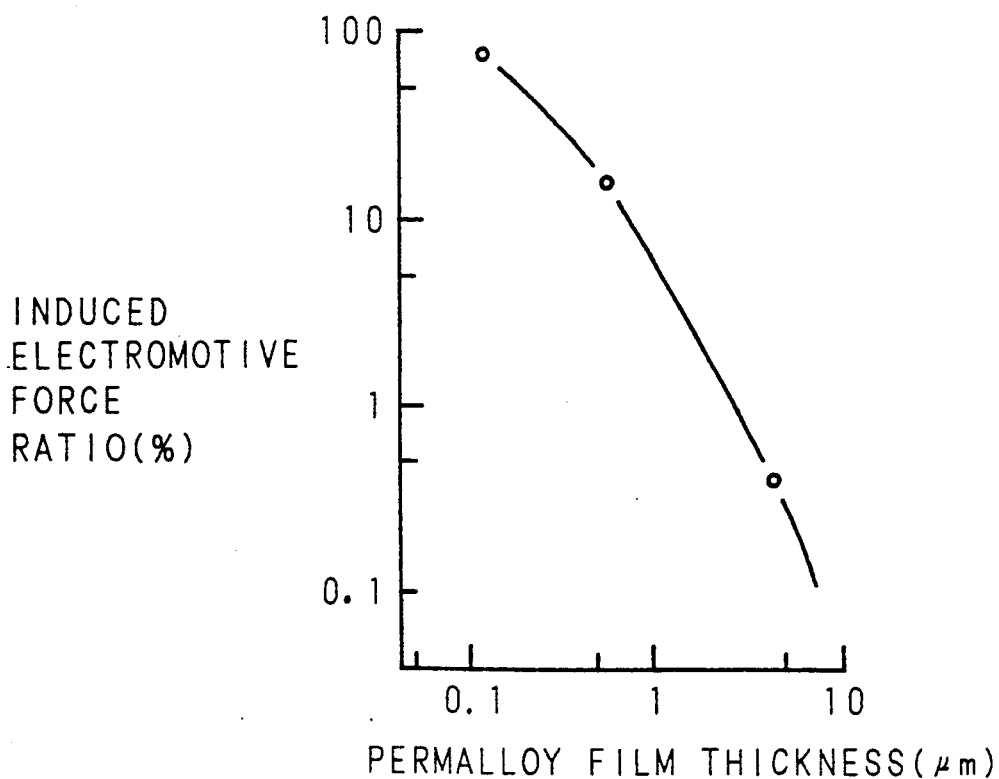

FIG. 5 is a graph showing the result of the same tests as in the first embodiment, that is, induced electromotive forces in the magnetic discs 21 with two shielding layers 22 of 0.025 $\mu$m, 0.25 $\mu$m or 2.5 $\mu$m thick for one layer. The electromotive force ratios are 95%, 20% or 0.4% in respective film thicknesses. As is understood from the graph, in the shielding layer 22 formed of magnetic material, when the total film thickness is over 1 $\mu$m, the induced electromotive force ratio is smaller, i.e., the effect of the shielding layers 22 is outstanding.

Further, the shielding effect of magnetic material against electromagnetic noise mostly depends on the relative permeability thereof. Therefore, the shielding layer 22 may be thinner when the magnetic material having higher relative permeability is employed for the shielding layer.

Although the shielding layers 22 both in the first and second embodiments are formed of nonmagnetic material or magnetic material alone, the combination of the materials may achieve the same effect.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A magnetic disc for use with a disc drive unit having magnetic reading/writing heads comprising:
   a substrate,
   a first and second magnetic layers formed on opposite sides of the substrate for recording data therein and having directions of magnetization that are in parallel with upper and lower surfaces of the magnetic disc, and
   a first shielding layer formed between said first magnetic layer and said substrate, said shielding layer being of a selected thickness to prevent electromagnetic waves induced by one of the magnetic reading/writing heads on one side of the disc from influencing the magnetic layer on the opposite side of the disc.

2. A magnetic disc as set forth in claim 1, further comprising a second shielding layer formed between said substrate and said second magnetic layer to prevent electromagnetic waves induced on one side of the disc from influencing the magnetic layer on the opposite side of the disc.

3. A magnetic disc as set forth in claim 1, wherein said shielding layer is formed of non-magnetic material.

4. A magnetic disc as set forth in claim 3, wherein said non-magnetic material is Ni-P alloy having a thickness in a range greater than 10 micrometers and less than 50 micrometers.

5. A magnetic disc as set forth in claim 1, wherein said shielding layer is formed of magnetic material.

6. A magnetic disc as set forth in claim 5, wherein said magnetic material is permalloy.

7. A magnetic disc as set forth in claim 6 wherein said layer of permalloy is a layer of an Ni-Fe alloy having a thickness in excess of 1 micrometer.

* * * * *